United States Patent
Doblar et al.

(10) Patent No.: US 8,446,985 B2
(45) Date of Patent: May 21, 2013

(54) METHOD AND SYSTEM FOR REDUCING DUTY CYCLE DISTORTION AMPLIFICATION IN FORWARDED CLOCKS

(75) Inventors: Drew G. Doblar, San Jose, CA (US); Dawei Huang, San Diego, CA (US); Deqiang Song, San Diego, CA (US)

(73) Assignee: Oracle America, Inc., Redwood City, CA (US)

( * ) Notice: Subject to any disclaimer, the term of this patent is extended or adjusted under 35 U.S.C. 154(b) by 792 days.

(21) Appl. No.: 12/343,426

(22) Filed: Dec. 23, 2008

(65) Prior Publication Data

US 2010/0158182 A1 Jun. 24, 2010

(51) Int. Cl.
- H03H 7/30 (2006.01)
- H03H 7/40 (2006.01)
- H03K 5/159 (2006.01)

(52) U.S. Cl.
USPC .......................................... 375/326; 375/234

(58) Field of Classification Search
USPC .......... 375/229, 234, 340, 373, 232; 370/516, 370/503; 455/14
See application file for complete search history.

(56) References Cited

U.S. PATENT DOCUMENTS

| | | | |
|---|---|---|---|
| 6,134,275 A * | 10/2000 | Reiner | 375/300 |
| 6,134,374 A * | 10/2000 | Harumatsu et al. | 386/328 |
| 6,933,759 B1 * | 8/2005 | Wu et al. | 327/172 |
| 2003/0184381 A1 * | 10/2003 | Wyman et al. | 330/277 |
| 2005/0002475 A1 * | 1/2005 | Menolfi et al. | 375/340 |
| 2008/0218254 A1 * | 9/2008 | Wu | 327/553 |
| 2009/0010320 A1 * | 1/2009 | Hollis | 375/232 |

OTHER PUBLICATIONS

Higashi et al., A 5-6.4-Gb/s 12-Channel Transceiver With Pre-Emphasis and Equalization, Apr. 2005, IEEE Journal of Solid-State Circuits, vol. 40, No. 4.*

Higashi et a.,"A 5-6.4-Gb/s 12-channel transceiver with pre-emphasis and equalization", Apr. 2005, Solid-State Circuits, IEEE Journal.*

Higashi et al., A 5-6.4-Gb/s 12-channel Transceiver with Pre-Emphasis and Equalization, Apr. 2005, solid-State circuits, IEEE.*

* cited by examiner

Primary Examiner — David C. Payne
Assistant Examiner — Wednel Cadeau
(74) Attorney, Agent, or Firm — Osha Liang LLP

(57) ABSTRACT

A method and apparatus for reducing the amplification of the duty cycle distortion of high frequency clock signals when is provided. A data signal is sent to a receiver via a first channel. A clock signal is sent to the receiver via a second channel. The clock signal is filtered to substantially remove therefrom low frequency components before the clock signal is used by the receiver to recover data from the data signal.

20 Claims, 6 Drawing Sheets

METHOD AND SYSTEM FOR REDUCING DUTY CYCLE DISTORTION AMPLIFICATION IN FORWARDED CLOCKS

FIELD OF INVENTION

The present invention relates generally to circuit design and a method for reducing duty cycle distortion amplification in forwarded clocks.

BACKGROUND

Today's integrated circuits (ICs) exchange information with each other and with other components at very high data rates. Typically, information is sent from a transmitter on one IC to a receiver on another IC through a series of analog pulses on a communications channel. Specifically, to send a digital bit of information, a transmitter determines whether the bit it wants to send is a digital 1 or a digital 0. If the bit is a digital 1, the transmitter generates an analog signal (which may be made up of a single signal or a pair of differential signals) having a positive voltage. If the bit is a digital 0, the transmitter generates an analog signal having a negative voltage. After generating the analog signal, the transmitter sends the analog signal as a pulse having a certain duration to the receiver along the communications channel. Upon receiving an analog pulse, the receiver determines whether the analog signal has a positive voltage or a negative voltage. If the voltage is positive, the receiver determines that the analog signal represents a digital 1. If the voltage is negative, the receiver determines that the analog signal represents a digital 0. In this manner, the transmitter is able to provide digital information to the receiver using analog signals.

A series of analog signals is transmitted by transmitting a series of analog pulses, each having a certain duration and each having either a positive voltage or negative voltage depending on whether the transmitter is sending a digital 1 or a digital 0 during the duration. The number of analog pulses that are transmitted during a particular period of time depends on the length of the duration of each of the analog pulses. This is also the number of digital bits that are communicated from the transmitter to the receiver during the particular period of time, and is referred to as the data rate. For example, if an analog pulse is transmitted once every billionth of a second, then one billion digital bits can be communicated in a second, and the data rate is 1,000,000,000 bits per second. Today's ICs typically exchange information at data rates of at least 1 gigabit per second.

At such high data rates, jitter in the analog signal received by IC receivers poses a serious problem. A receiver can recover a clock signal from a received analog signal and use the recovered clock signal to sample the analog signal in order to determine whether the analog signal that is received during a duration of time, or clock cycle, is positive or negative. When the analog signal contains jitter, however, the clock signal that is recovered from the analog signal will also contain jitter that is out of phase with the jitter in the analog signal. As a result, using this recovered clock signal introduces timing error into the receiver's sampling of the analog signal and may result in erroneous determinations of whether an analog signal represents a digital 1 or digital 0 during a duration of time. To account for this timing error, the receiver must sample the data signal during a period of time in the clock cycle in which the analog signal is not affected by its jitter. Effectively, this reduces the amount of timing budget that is available to the receiver for sampling the analog signal.

In one solution to the jitter problem, a clock signal is sent from the transmitter to the receiver along with the analog signal. This clock signal is often referred to as a "forwarded clock" and has a clock rate that is substantially the same as half of the data rate of the analog signal. The analog signal is also referred to as the data signal. For example, if the data rate of the data signal is 1 gigabit per second, then the clock rate of the forwarded clock would be 0.5 gigahertz. In another words, one clock cycle, which typically consists of two time periods where the clock signal is positive in the first time period and negative in the second time period, corresponds to two data unit cycles.

In addition, the forwarded clock contains an amount of timing error that is substantially the same as the timing error caused by the jitter in the data signal. This forwarded clock is then used by the receiver to recover data from the data signal. Because the forwarded clock contains a timing error that correlates with the timing error in the data signal, using the forwarded clock to sample the data signal reduces errors in sampling the data signal and results in a larger timing budget for the receiver.

Ideally, the forwarded clock would have a 50% positive duty and a 50% negative duty, like clock signal 100 pictured in FIG. 1. Clock signal 100 has a positive duty 102 that is equal to the negative duty 104. A clock signal that has a 50% positive duty and a 50% negative duty has no duty cycle distortion because the positive duty is equal to the negative duty.

Duty cycle distortion, or DCD, refers to deviations, in a clock signal, from the ideal 50-50 duty cycle. FIG. 2 illustrates a clock signal 200 that has DCD. More specifically, clock signal 200 in FIG. 2 has a positive duty 202 that is less than 50% and a negative duty 204 that is more than 50%. When a clock signal contains DCD, the amount of time between the rising edge of the clock signal and the falling edge of the clock signal (202) does not match the amount of time between the falling edge of the clock signal and the rising edge of the clock signal (204). DCD can be caused by a mismatch in device characteristics between P-type transistors and N-type transistors, which results in asymmetry between a clock signal's rising edge and falling edge. However, since these edges are used by a receiver to sample the data signal, the receiver must sample the data signal during a period of time in the clock cycle in which the clock signal is not affected by DCD. Thus, DCD reduces the amount of timing budget that is available to the receiver.

Furthermore, when a high-frequency clock signal, such as clock signals over 2 gigahertz, is transmitted over a lossy channel, the DCD of the clock signal becomes amplified. A lossy channel in general is a data channel where signal loss cannot be ignored. Unless very specially designed, lossy channels have higher attenuation for high frequency components and lower attenuation for low frequency components. In FIG. 3, dotted waveform 306 represents the clock signal 200 that is depicted in FIG. 2, and clock signal 300 is clock signal 200 after transmission through a lossy channel. As FIG. 3 illustrates, clock signal 300 is attenuated relative to clock signal 200. Furthermore, clock signal 300 is attenuated such that the positive duty 302 is even less than the positive duty 202 in clock signal 200. Also, the negative duty 304 of clock signal 300 is even bigger than the negative duty 204 in clock signal 200. The overall result is that the DCD of clock signal 300 is larger than the DCD of clock signal 200. In other words, the DCD of clock signal 300 is amplified relative to the DCD of clock signal 200. Experimental data indicates that the DCD of a clock signal can be amplified five times or more of the original DCD after being transmitted over a lossy channel. This has the effect of significantly reducing the timing budget available to the receiver.

Since data signals transmitted between today's ICs are transmitted over lossy channels and often have data rates over 2 gigahertz, DCD amplification is a significant problem in IC communications. This problem is especially prominent in lossy channels where the clock signal experiences at least a −6 dB loss at the frequency of the clock rate (for example, when the 500 MHz frequency component of a 500 MHz clock experiences a −6 db loss on the lossy channel). Although reducing the DCD in clock signals that are transmitted is one solution, techniques for doing so involve significant design time and expensive components in the transmitter. Thus, a practical solution for reducing the amplification of DCD of clock signals at high frequencies is needed.

SUMMARY OF THE INVENTION

A method is provided for reducing the amplification of a clock signal's DCD during transmission on a lossy channel. The amplification of the clock signal's DCD can be a result of the lossy channel's disproportionate attenuation of high frequency and low frequency components of the clock signal. The lossy channel inherently attenuates the clock signal's high frequency components much more than the lossy channel attenuates the clock signal's low frequency components. In the provided method, the clock signal is filtered such that DC and low frequency components of the clock signal are substantially removed from the clock signal. The removal of DC and low frequency components of the clock signal effectively attenuates the DC and low frequency components of the clock signal, thereby lessening the disproportion of attenuation effected by the lossy channel and consequently reducing the amplification of the clock signal's DCD.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Typically, the DCD of a clock signal is amplified after being transmitted over a lossy channel because the lossy channel attenuates the high-frequency components of the clock signal much more than it attenuates the low-frequency components of the clock signal. This problem is especially prominent in lossy channels where the clock signal experiences at least a =6 dB loss at the frequency of the clock rate (for example, when the 500 MHz frequency component of a 500 MHz clock experiences a −6 db loss on the lossy channel). In contrast, the DC and low-frequency components of the clock signal are only minimally attenuated by the lossy channel. As a result, after transmission of the clock signal over the lossy channel, the clock signal's DC and low frequency components of the clock signal become disproportionately more significant relative to the clock signal's high frequency components. In other words, since the DC and low-frequency components of the clock signal are not attenuated in the lossy channel as much as the high-frequency components of the clock signal, the clock signal received by the receiver contains a more significant proportion of DC and low-frequency components than that contained in the clock signal initially sent by the transmitter.

Figure 1:
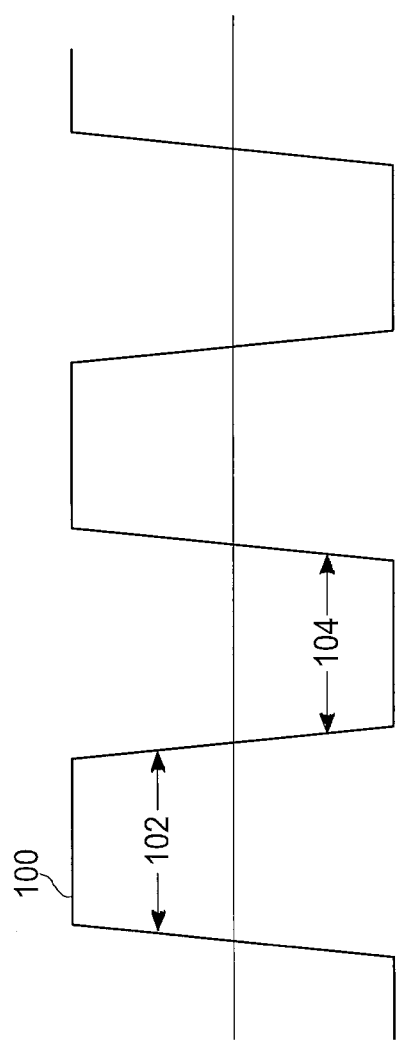
FIG. 1 shows a sample clock signal with no duty cycle distortion.
Figure 2:
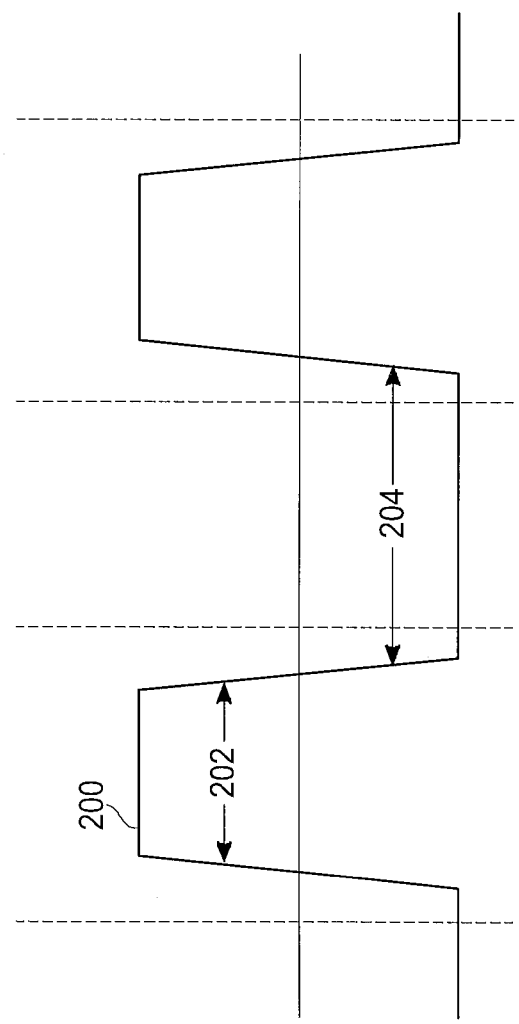
FIG. 2 shows a sample clock signal with duty cycle distortion.
Figure 3:
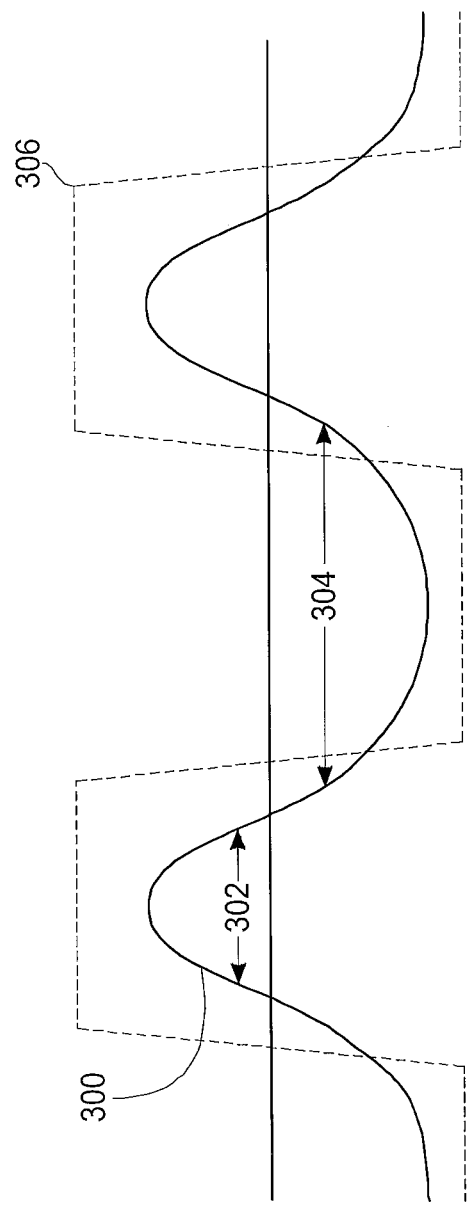
FIG. 3 shows a sample clock signal with a duty cycle distortion that is amplified relative to the duty cycle distortion of the sample clock signal in FIG. 2.

The lossy channel's disproportionate attenuation of high frequency and low frequency components of the clock signal results in an effective amplification of the clock signal's DCD. As FIG. 3 illustrates, clock signal 300, which has been transmitted on a lossy channel and whose high-frequency components have been attenuated, exhibits a DCD that's is amplified relative to the DCD of clock signal 306, which has not yet been transmitted through the lossy channel and whose high-frequency components have not yet been attenuated. Specifically, the width 302 of the positive pulse of clock signal 300 is smaller than the width of the positive pulse of clock signal 306, and the width 304 of the negative pulse of clock signal 300 is larger than the width of the negative pulse of clock signal 306. As a result, clock signal 300 has a greater amount of DCD than clock signal 306.

According to one embodiment, to reduce the amplification of the DCD of a clock signal by a lossy channel, the low frequency components and DC component of the clock signal are removed before the clock signal is used by the receiver to sample the data signal. The removal of the clock signal's low frequency and DC counters the effects of the lossy channel's inherent attenuation of the clock signal's high frequency components. In other words, the lossy channel's inherent attenuation of the clock signal's high frequency components had resulted in an effective increase in proportion of the clock signal's DC and low frequency components relative to the clock signal's high frequency components. This effective increase in proportion, however, may be substantially cancelled by removing the DC and low frequency components from the clock signal. As a result, the disproportion of attenuation effected by the lossy channel is lessened and the amplification of the clock signal's DCD is also consequently reduced.

In one embodiment, the removal of the clock signal's low frequency and DC components is effected through AC coupling of the clock signal. Typically, the clock signal is fully coupled to the receiver, which effectively passes DC, low frequency, and high frequency components. When the clock signal is AC coupled, however, DC and low-frequency components are attenuated. One method of AC coupling the clock signal is to pass the clock signal through a high pass filter, such as a capacitor, which passes the clock signal's high frequency components but attenuates or eliminates the clock signal's DC and low frequency components. In one embodiment, the low frequency components of a clock signal that are removed are the frequency components of the clock signal that are 30 kilohertz or less. In other embodiments, frequency components in the clock signal that are in other ranges of frequencies (e.g., 100 kilohertz or less) may be removed from the clocks signal.

Figure 4:
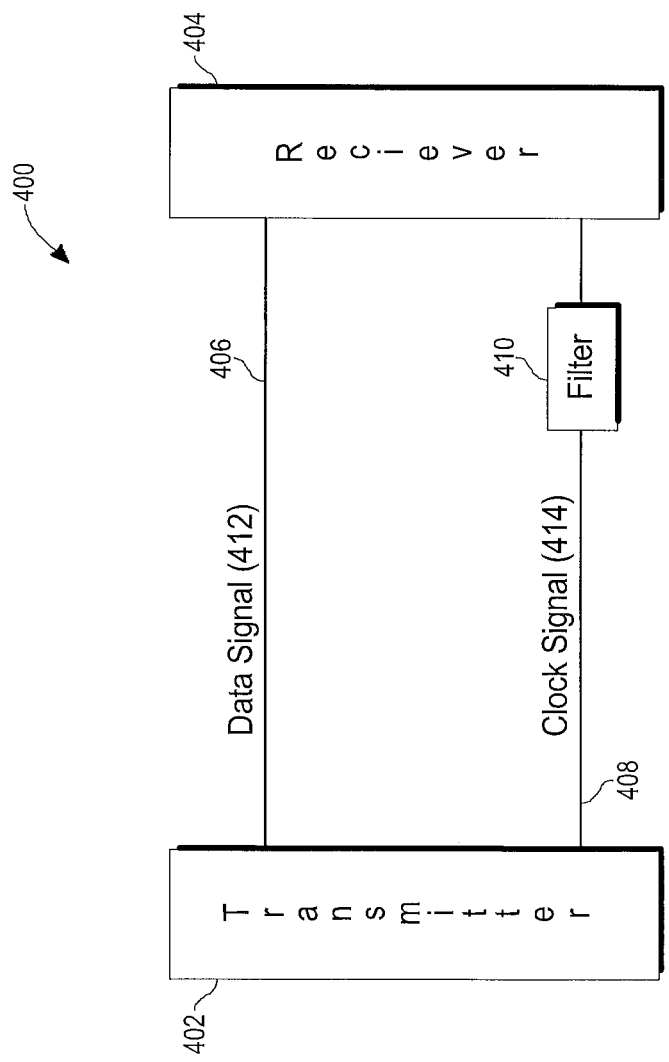
FIG. 4 depicts a system that may be used to implement an embodiment of the present invention.

FIG. 4 illustrates a system 400 that includes transmitter 402 and receiver 404. Transmitter 402 transmits data signal 412 to receiver 404 on lossy channel 406. Transmitter 402 also transmits clock signal 414 to receiver 404 on lossy channel 408. The DCD of clock signal 414 is amplified after clock signal 414 is transmitted on lossy channel 408, thereby making it more difficult for receiver 404 to sample clock 414. To significantly reduce the DCD amplification of the clock signal, according to one embodiment, filter 410 is imposed on lossy channel 408 to attenuate the low frequency and DC components of clock signal 414. Filter 410 in effect AC-couples the clock signal 414 to the receiver 404. Filter 410 may be a high-pass filter. For example, filter 410 may be a passive RC network (capacitor-resistor network) or may comprise active circuitry. In one example, filter 410 is a capacitor. Filter 410 may also be a series capacitor. In one example, filter 410 is a capacitor of 0.1 micro farad. Other capacitance values can be used depending on specific applications. Filter 410 may be a discretely packaged capacitor or an integrated on-chip capacitor. Discretely packaged capacitors are effective for assembly onto printed circuit boards or onto the packages that contain chips on which a transmitter or receiver is located. Filter 410 may be designed to attenuate frequency components of clock signal 414 that are less than a certain frequency threshold, such as 30 kilohertz.

The removal of the clock signal's low frequency and DC components may be effected anywhere after the clock signal is transmitted and before the clock signal is used by the receiver to sample the data signal. In the example shown on FIG. 4, the filter 410 is implemented in the lossy channel 408. If so desired, the filter 410 may also be implemented within the transmitter 402 or the receiver 404, depending on system requirement and implementation costs, such as where filter 410 can be physically fit into a package or an area of a printed circuit board or best situated so as to not significantly increase the cost of transmitter 402 or receiver 404.

Figure 5:
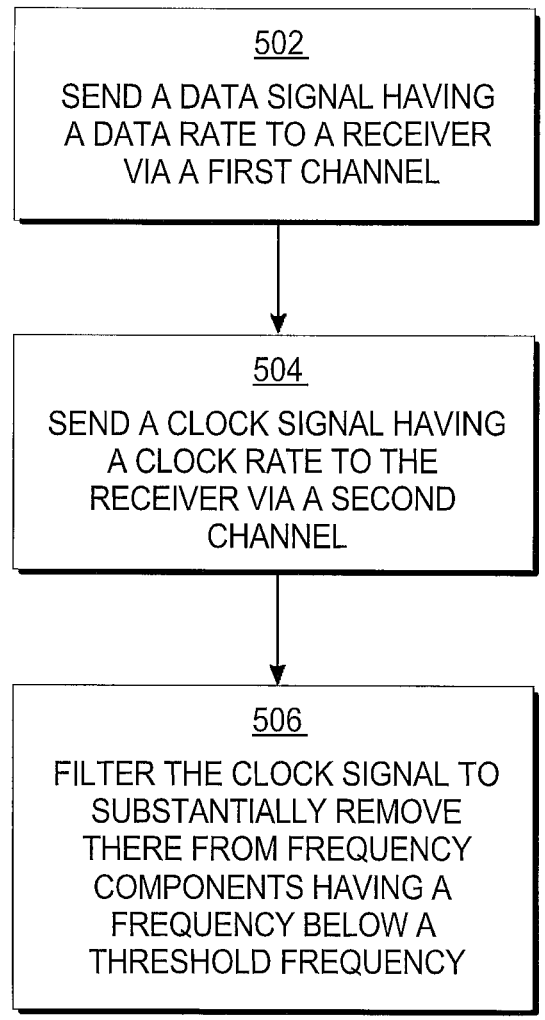
FIG. 5 is an operational flow diagram illustrating an operation in accordance with one embodiment of the present invention.

FIG. 5 illustrates a flow chart that describes steps for reducing the DCD amplification of a clock signal (such as clock signal 414 in FIG. 4) from being transmitted through a lossy channel (such as channel 408). In step 502, a data signal (such as data signal 412) having a data rate is sent to a receiver (such as receiver 404) via a first channel (such as channel 406). In step 504, a clock signal (such as clock signal 414) having a clock rate that is substantially the same as half of the data rate is sent to the receiver (such as receiver 404) via a second channel (such as channel 408). In other embodiments, the clock rate may be different fractions of or different multiples of the data rate. Steps 502 and 504 need not be performed in order, and the sending of data and clock signals may be ongoing and simultaneous. In step 506, the clock signal is filtered so that frequency components having a frequency below a threshold frequency (e.g., 30 kilohertz) are substantially removed from the clock signal. This filtering may be performed by a filter such as filter 410 in FIG. 4. The step of filtering reduces the DCD amplification that is effected upon the clock signal by the second channel.

Experimental data indicates that the removal of a clock signal's low frequency and DC components results in the reduction of DCD amplification by a factor of up to 40.

Although the clock signal has been described as a single signal, the techniques described herein are equally applicable to differential clocking, where two clock signals that are inverted in phase relative to each other are transmitted from a transmitter to a receiver. Typically, these two clock signals are referred to as positive and negative clocks. Thus, each positive and negative clock of a pair of differential clock signals may have its low frequency and DC components removed to effect a reduction in DCD amplification.

Figure 6:
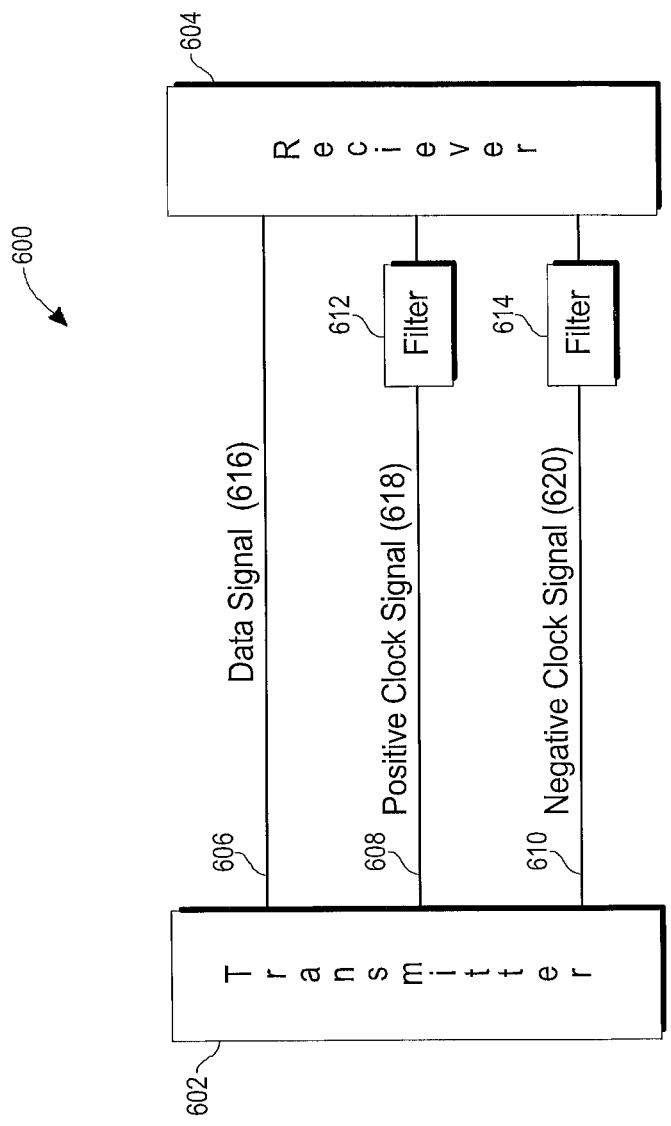
FIG. 6 depicts a system that may be used to implement an embodiment of the present invention that includes differential clock signals.

FIG. 6 illustrates a system 600 that includes transmitter 602 and receiver 604. Transmitter 602 transmits data signal 616 to receiver 604 on lossy channel 606. Transmitter 602 also transmits positive clock signal 618 to receiver 604 on lossy channel 608 and negative clock signal 620 to receiver 604 on lossy channel 610. Negative clock signal 620 is inverted in phase relative to positive clock signal 618 such that negative clock signal 620 and positive clock signal 618 comprise a differential signal. The DCD of differential clock signal 618 and 620 is amplified after the differential clock signal 618 and 620 is transmitted on lossy channels 608 and 610. According to one embodiment, filter 612 attenuates the low frequency and DC components of positive clock signal 618 to reduce the effects of DCD amplification. Similarly, filter 614 attenuates the low frequency and DC components of negative clock signal 620 to reduce the effects of DCD amplification. The filters 614 and 618 AC couple the clock signals to receiver 604 and may be high-pass filters, such as capacitors. The filters 614 and 618 may be designed to attenuate frequency components of the differential clock signals that are less than a certain frequency threshold, such as 30 kilohertz.

In another embodiment, the data signal may also be a differential clock signal that comprises a positive data signal that is transmitted on one lossy channel and a negative data signal that is transmitted on another lossy channel.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiment used to illustrate it but only by the scope of the issued claims and the equivalents thereof.

What is claimed is:

1. A method comprising:
    sending a data signal having a data rate to a receiver via a first channel;
    sending a clock signal having a clock rate to the receiver via a second channel,
    wherein the clock rate is substantially half of the data rate,
    wherein a frequency component, of the clock signal, having a frequency substantially equal to the clock rate experiences a loss of at least −6 dB on the second channel,
    wherein disproportion of attenuation of the clock signal is effected by the second channel, and
    wherein the clock signal is used by the receiver to recover data from the data signal; and
    filtering the clock signal to substantially remove therefrom frequency components having a frequency below a threshold frequency,
    wherein the threshold frequency is configured so that the filtering of the clock signal counters the disproportion of attenuation.

2. The method of claim 1, wherein the threshold frequency is 30 kilohertz.

3. The method of claim 1, wherein filtering the clock signal comprises AC-coupling the clock signal to the receiver.

4. The method of claim 1, wherein filtering the clock signal comprises passing the clock signal through a high-pass filter.

5. The method of claim 1,
wherein the clock signal is a first clock signal and wherein the method further comprises:
sending a second clock signal having the clock rate to the receiver;
wherein the second clock signal is sent to the receiver via a third channel,
wherein the second clock signal is inverted in phase relative to the first clock signal such that the first and second clock signals comprise a differential clock signal, and
wherein the second clock signal is also used by the receiver to recover data from the data signal; and
filtering the second clock signal to substantially remove therefrom frequency components having a frequency below the threshold frequency, thereby reducing duty cycle distortion experienced by the receiver for the second clock signal.

6. The method of claim 5, wherein filtering the second clock signal comprises AC-coupling the second clock signal to the receiver.

7. The method of claim 5, wherein filtering the second clock signal comprises passing the second clock signal through a high-pass filter.

8. The method of claim 1,
wherein the data signal is a first data signal and wherein the method further comprises:
sending a second data signal having the data rate to the receiver; and
wherein the second data signal is inverted in phase relative to the first data signal such that the first and second data signals comprise a differential data signal.

9. A method comprising:
sending a data signal having a data rate to a receiver via a first channel;
sending a clock signal having a clock rate to the receiver via a second channel,
wherein the clock rate is half of the data rate,
wherein the clock rate is at least two gigahertz,
wherein disproportion of attenuation of the clock signal is effected by the second channel, and
wherein the clock signal is used by the receiver to recover data from the data signal; and
filtering the clock signal to substantially remove therefrom frequency components having a frequency below a threshold frequency,
wherein the frequency components are selected from a group consisting of DC components and low frequency components
wherein the threshold frequency is configured so that the filtering of the clock signal counters the disproportion of attenuation.

10. The method of claim 9, wherein the threshold frequency is 30 kilohertz.

11. The method of claim 9, wherein filtering the clock signal comprises AC-coupling the clock signal to the receiver.

12. The method of claim 9,
wherein the data signal is a first data signal and wherein the method further comprises:
sending a second data signal having the data rate to the receiver; and
wherein the second data signal is inverted in phase relative to the first data signal such that the first and second data signals comprise a differential data signal.

13. A system comprising:
a transmitter;
a receiver;
a first channel;
a second channel; and
a filter;
wherein: the transmitter sends a data signal having a data rate to the receiver via the first channel;
the transmitter sends a clock signal having a clock rate to the receiver via the second channel; the clock rate is half of the data rate;
a frequency component, of the clock signal, having a frequency substantially equal to the clock rate experiences a loss of at least −6 dB on the second channel;
wherein disproportion of attenuation of the clock signal is effected by the second channel,
the receiver uses the clock signal to recover data from the data signal; and
the filter filters the clock signal to substantially remove therefrom frequency components having a frequency below a threshold frequency,
wherein the threshold frequency is configured so that the filtering of the clock signal counters the disproportion of attenuation.

14. The system of claim 13, wherein the threshold frequency is 30 kilohertz.

15. The system of claim 13, wherein the filter filters the clock signal by AC-coupling the clock signal to the receiver.

16. The system of claim 13, further comprising
a third channel,
wherein: the clock signal is a first clock signal;
the transmitter sends a second clock signal having the clock rate to the receiver;
the second clock signal is inverted in phase relative to the first clock signal such that the first and second clock signals comprise a differential clock signal;
the transmitter sends the second clock signal having the clock rate to the receiver via the third channel;
the second clock signal is also used by the receiver to recover data from the data signal;
the system further comprises another filter that filters the second clock signal to substantially remove therefrom frequency components having a frequency below a threshold frequency.

17. The system of claim 16, wherein the second filter filters the second clock signal by AC-coupling the second clock signal to the receiver.

18. The system of claim 16,
wherein: the data signal is a first data signal; the transmitter sends a second data signal having the data rate to the receiver; and
the second data signal is inverted in phase relative to the first data signal such that the first and second data signals comprise a differential data signal.

19. The method of claim 1, wherein the frequency components are selected from a group consisting of DC components and low frequency components.

20. The system of claim 13, wherein the frequency components are selected from a group consisting of DC components and low frequency components.

* * * * *